United States Patent
Tremolada et al.

(10) Patent No.: US 9,153,005 B2
(45) Date of Patent: Oct. 6, 2015

(54) METHOD AND SYSTEM FOR AUTHENTICATING A SECURE DOCUMENT

(75) Inventors: Fabio Tremolada, Paris (FR); Marc M. Pic, Boulogne Billancourt (FR); Mathieu Hoarau, Paris (FR)

(73) Assignee: HOLOGRAM INDUSTRIES, Bussy-Saint-Georges (FR)

( * ) Notice: Subject to any disclaimer, the term of this patent is extended or adjusted under 35 U.S.C. 154(b) by 6 days.

(21) Appl. No.: 14/006,863

(22) PCT Filed: Mar. 23, 2012

(86) PCT No.: PCT/FR2012/050605
§ 371 (c)(1),
(2), (4) Date: Nov. 8, 2013

(87) PCT Pub. No.: WO2012/131239
PCT Pub. Date: Oct. 4, 2012

(65) Prior Publication Data
US 2014/0055824 A1 Feb. 27, 2014

(30) Foreign Application Priority Data
Mar. 25, 2011 (FR) .................................. 11 52522

(51) Int. Cl.
*H04N 1/405* (2006.01)
*G06T 1/00* (2006.01)
(Continued)

(52) U.S. Cl.
CPC .......... *G06T 1/0021* (2013.01); *G06K 9/00442* (2013.01); *G06K 9/76* (2013.01); *G07D 7/0006* (2013.01); *G07D 7/124* (2013.01); *G07D 7/20* (2013.01)

(58) Field of Classification Search
CPC .............. H04N 2201/3225; H04N 2201/3226; H04N 2201/3233; H04N 2201/3235; H04N 2201/3236; H04N 2201/3238; H04N 2201/3239; H04N 2201/323

USPC ......... 358/3.28, 1.18, 1.9, 2.1, 470, 468, 448; 382/181–183, 116, 190, 195
See application file for complete search history.

(56) References Cited

U.S. PATENT DOCUMENTS 6,336,666 B1   1/2002   Trantoul
6,543,810 B2   4/2003   Trantoul
(Continued)

FOREIGN PATENT DOCUMENTS

BR   200406491 A   *   7/2006
WO   WO 98/47714       10/1998
(Continued)

*Primary Examiner* — Thomas D Lee
*Assistant Examiner* — Stephen M Brinich
(74) *Attorney, Agent, or Firm* — Hamre, Schumann, Mueller & Larson, P.C.

(57) ABSTRACT

The method of automatically authenticating a document having a label-forming portion comprises the following steps:
a) printing an authentic label having optically-variable elements;
b) photographing the authentic label to create a first reference image;
c) calculating and storing a reference digital fingerprint of the label;
d) photographing a label for verification successively in first lighting conditions and in second lighting conditions that are essentially different from the first lighting conditions in order to create first and second verification images, by using a camera having a communications unit, a memory unit, and a calculation unit;
e) verifying the optically-variable nature of said elements from the first and second verification images and calculating a verification digital fingerprint for the label that is to be verified; and
f) comparing the verification digital fingerprint with the corresponding reference digital fingerprint, calculating the distance between these two digital fingerprints, and comparing the distance with a predetermined threshold.

16 Claims, 7 Drawing Sheets

(51) Int. Cl.
  *G07D 7/00* (2006.01)
  *G07D 7/12* (2006.01)
  *G07D 7/20* (2006.01)
  *G06K 9/00* (2006.01)
  *G06K 9/76* (2006.01)

(56) References Cited

U.S. PATENT DOCUMENTS 7,552,120 B2  6/2009  Essafi et al.

2003/0002707 A1  1/2003  Reed et al.
2004/0188528 A1  9/2004  Alasia et al.
2004/0258274 A1  12/2004  Brundage et al.
2005/0175230 A1  8/2005  Kortum et al.

FOREIGN PATENT DOCUMENTS

WO   WO 2005/055086       6/2005
WO   WO 2006042913 A1 *   4/2006
WO   WO 2007/087498       8/2007

* cited by examiner

METHOD AND SYSTEM FOR AUTHENTICATING A SECURE DOCUMENT

FIELD OF THE INVENTION

The present invention relates to authenticating and identifying articles by making use of security labels.

PRIOR ART

Various articles or documents are already known that make use of numbered traceability labels, each including a security element for ensuring identification of the article or document provided with said label, which element can be checked:

either by eye by a human checker (e.g. using security of the hologram or variable ink type), ideally by comparison with a reference authenticating element;

or else by a specific automatic checker tool adapted to the technology that is used.

More particularly, proposals have already been for authentication methods using specific kinds of lighting (e.g. in the ultraviolet or the infrared range), e.g. of the kind described in document US 2004/0188528 A1.

Proposals are also made, in document WO 2010/094859, for a method of making documents secure that makes use of backlighting and of watermarks.

Document WO 98/47714 proposes a method of fabricating a film having a pattern that cannot be reproduced by optical scanning in order to protect documents. In that method, a glossy indented imprint is made in the outside face of the film in order to prevent reproduction by optical reading.

Document WO 2007/087498 also describes a method of making secure in which a directional albedo of a particular article such as an identity card is measured and stored, and thereafter, when it is desired subsequently to confirm that it is indeed the same particular article, the albedo function is measured once again and a match is sought with the previously stored data. That method nevertheless requires several pictures to be taken while modifying the relative orientation between the article and the camera.

Also known, e.g. from document US 2005/0175230 A1, are devices for recognizing bank notes that make use of a photographic image and a comparison with prerecorded images.

OBJECT AND BRIEF SUMMARY OF THE INVENTION

An object of the present invention is to remedy the drawbacks of prior art authentication methods and systems.

In particular, the invention seeks to improve the level of security by making it easier to detect forgery by photocopy or by any other reproduction means, without any need to use specialized equipment, or to use lighting conditions in a special frequency range outside the visible light range, or to require multiple relative positions between a document for checking and equipment for checking the document.

The invention also seeks to make it possible to authenticate a secure document automatically, and where appropriate to identify the document simultaneously.

The invention also seeks to make it possible to check authenticity using a consumer tool that is not dedicated to performing this operation.

In accordance with the invention, these objects are achieved by a method of automatically authenticating a secure document including at least one label-forming portion, the method being characterized in that it comprises the following steps:

a) printing an authentic label provided with optically-variable elements including at least a first zone of optically-variable elements of a first type presenting reflection properties that are different from the surface of the label for a light source in the visible light frequency range oriented in predetermined manner relative to said surface;

b) photographing said authentic label at least under first lighting conditions in the visible light frequency range in order to create at least one first reference image;

c) calculating a reference digital fingerprint of the label from said at least one first reference image and storing said reference digital fingerprint;

d) photographing a label that is to be verified of a secure document of authenticity that is to be verified under conditions similar to the conditions in which the authentic label was photographed, shooting from the same angle and in succession at least in first lighting conditions in the visible light frequency range and in second lighting conditions essentially different from the first lighting conditions and in the same visible light frequency range, in order to create at least first and second verification images, using a camera having at least a communications unit, a memory unit, and a calculation unit;

e) verifying the optically-variable nature of said elements from said at least first and second verification images and calculating a verification digital fingerprint of the label for verification from at least one of said first and second verification images; and f) comparing the verification digital fingerprint and the corresponding reference digital fingerprint, calculating the distance between these two digital fingerprints, and comparing said distance with a predetermined threshold in order to authenticate the label for verification of the secure document that is to be authenticated only if said distance is less than or equal to said threshold.

Between the first and second lighting conditions in the visible light frequency range, it is the geometrical characteristics of lighting conditions that vary, such as the size of the source or the position of the source relative to the observation position and relative to the medium, with the entire visible light spectrum being taken into account and with there being no need to make use of observations outside the visible light spectrum.

In a particular implementation, said optically-variable elements of the first type comprise holographic patterns of foil removal constituted by foil holographic graphics elements in a transparent strip or by transparent graphics elements in a holographic foil strip.

The term "holographic" covers any element with a diffracting or diffusing structure or a combination of such structures as known to the person skilled in the art and commonly used in the field of security.

According to a particular characteristic of the invention, an authentic label is printed that includes at least said first zone with optically-variable elements of the first type, and a second zone juxtaposed with said first zone and including random graphics elements for identification purposes.

Under such circumstances, and preferably, each of said first and second zones is divided into a plurality of subzones, and the subzones of the first and second zones are juxtaposed in alternation of interleaved manner.

By way of example, each subzone may be essentially rectangular with width lying in the range 0.5 millimeters (mm) to 5 mm, and preferably lying in the range 1 mm to 3 mm.

In a particular implementation, the optically-variable elements define a geometrically-invariant holographic pattern.

Under such circumstances, in an aspect of the invention, in order to create a reference image, the following steps are performed:

i) photographing a label;
ii) locating a graticule on the label;
iii) normalizing a zone of interest of the label as a result of locating the graticule;
iv) characterizing outlines of the zone of interest in which there is situated said first zone of optically-variable elements; and
v) creating a fingerprint by structuring and saving said fingerprint as a reference fingerprint.

In another particular implementation, the optically-variable elements define a geometrically-variable holographic pattern.

Under such circumstances, according to an aspect of the invention, e.g. prior to a step of putting the label into service (activation) and in order to create a reference database, the following steps are performed (enrollment):

i) photographing a label;
ii) locating a graticule on the label;
iii) normalizing a zone of interest of the label as a result of locating the graticule;
iv) identifying the label by reading an encoded portion situated in the zone of interest and characterizing outlines of the zone of interest in which there is situated said first zone having optically-variable elements; and
v) creating a fingerprint by structuring and saving the fingerprint as a reference digital fingerprint indexed by an identifier in a reference database.

In a particular implementation, the reference database is stored in a remote server.

The authentication process relies on taking two photographs in succession, or indeed some number of photographs greater than two, in a burst over a short period of time, preferably shorter than or equal to one second, and under different lighting conditions.

Advantageously, one of the first and second lighting conditions consists in lighting with the help of a flash, while the other of the first and second lighting conditions consists in lighting using ambient light without flash.

The difference of certain graphical aspects can then be measured between two photographs taken under different lighting conditions. These differences are visible only on surfaces reflecting along the shot-taking axis using reflection properties that are greater than those of an ordinary medium such as paper, card, or a plastics material, these reflecting surfaces constituting optically-variable elements. It is then possible with the help of discriminating image processing to determine whether the photographed label does indeed have such reflecting surfaces and is therefore other than a mere copy using conventional inks. It is thus possible to authenticate a label compared with simple counterfeits.

In another particular implementation, the calculation unit of the camera is used locally to perform the step of calculating the verification digital fingerprint, and the communications unit of said camera is used to transmit said verification digital fingerprint to said server in order to enable said sever to perform the step of comparing the verification digital fingerprint with the reference digital fingerprint and the step of performing authentication only and the step of performing authentication and identification.

In another particular implementation, the communications unit of said camera is used to transmit said first and second verification images to said server, and said server is used to perform the steps of calculating the verification digital fingerprint, and of comparing the verification digital fingerprint with the reference digital fingerprint, and the step of performing authentication only and authentication with identification.

The method may also include a final step consisting in sending the result of the authentication step and of the identification step as performed by the server to the communications unit of the camera.

In a particular implementation, when the optically-variable elements define a geometrically-invariant holographic pattern, all of the processing may be performed locally, and in particular the method may then be characterized in that the reference digital fingerprint is stored locally in said memory unit of the camera, and in that the calculation unit of the camera is used locally to perform the authentication calculation step consisting in verifying that the label for verification includes the expected optically-variable elements.

When the optically-variable elements define a variable holographic pattern, the pattern may itself include random graphics elements for identification purposes, such that the optically-variable elements activated in one of the two different lighting conditions (e.g. in the presence of a flash) may be used both as elements for authenticating a label and as elements for identifying the label.

In the method of the invention, during the step of creating a digital fingerprint, in a first possible implementation, the optically-variable elements are geometrically characterized from the image, whereas in a second possible implementation, the label is characterized by calculating descriptors based on global digital characterization approaches.

The invention also provides a label provided with optically-variable elements for a secure document that is to be authenticated, the label being characterized in that it comprises a zone of interest having at least a first zone with optically-variable elements presenting reflection properties that are different from the surface of the label for a light source in the visible light frequency range oriented in predetermined manner relative to said surface, and a second zone juxtaposed with said first zone and including random graphics elements for identification purposes, each of said first and second zones being subdivided into a plurality of subzones arranged in such a manner that the subzones of the first and second zones are juxtaposed in alternation in interleaved manner.

BRIEF DESCRIPTION OF THE DRAWINGS

Other characteristics and advantages of the invention appear from the following description of particular implementations given as non-limiting examples and with reference to the accompanying drawings, in which.

DETAILED DESCRIPTION OF PARTICULAR IMPLEMENTATIONS OF THE INVENTION

In general terms, the invention relates to secure documents or articles that may be fitted with a security label, such as consumer goods, visas, various articles or packaging that need to be fitted with labels for traceability or for protection that might need to be identified and/or authenticated. It is also possible under certain circumstances to envisage omitting the label medium and marking the item directly (this may apply to documents such as tax stickers, payment vouchers, . . . ).

Figure 1:
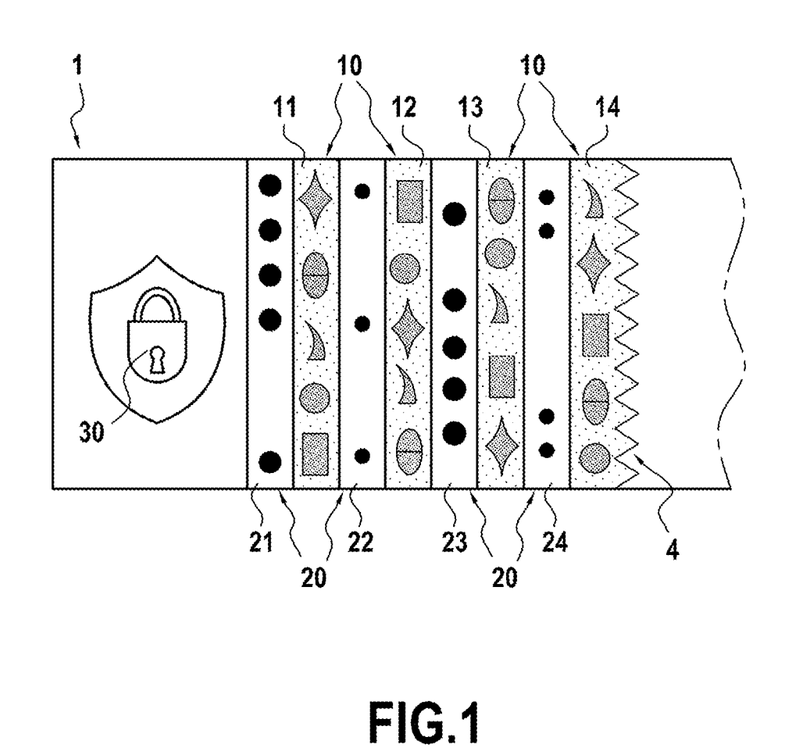
FIG. 1 is a diagrammatic view of an example of a security label of the invention.

FIG. 1 shows an example of a security label 1 in accordance with the invention and suitable for fitting to all kinds of document or article to be made secure.

The security label 1 (referred to more simply as a "label" in the description below) includes a zone 10 on at least one of its main faces, which zone includes optically-variable elements made up of randomly-cut foil elements in a surface that presents microstructures that are optically recognizable by taking two successive photographs (one with flash and the other without flash). The optically-variable elements may be made using patterns of foil removal constituted by foil graphics elements formed in a transparent strip or by transparent graphics elements randomly formed in a holographic foil strip.

Advantageously, the optically-variable portion (10) is extended by a laminated diffracting surface, e.g. showing a diffraction image (30) or a hologram, made in such a manner as to avoid counterfeiting merely by making use of marking with a metal-based ink.

The label 1 also preferably includes a zone 20 that is distinct from the zone 10, in which random graphics elements are formed for identification purposes, which elements may for example be matrices of black and white dots or colored dots distributed in random manner in the zone 20.

The label 1 also preferably includes a graticule (not shown), which may for example be made by crossing horizontal and vertical lines used for defining the juxtaposed zones 10 and 20, the graticule serving to correct possible distortion effects when taking photographs.

In the particular embodiment shown in FIG. 1, which is a preferred embodiment but is not limiting, both the zone 10 with optically-variable elements and also the zone 20 with random graphics elements for identification purposes are sub-divided into respective pluralities of subzones 11 to 14 and 21 to 24, the subzones 11 to 14 of the first zone 10 and the subzones 21 to 24 of the second zone 20 being juxtaposed in an inter-leaved alternation.

Each subzone 11 to 14 and 21 to 24 may for example be essentially rectangular in shape, of width lying in the range 0.5 mm to 5 mm, and preferably lying in the range 1 mm to 3 mm.

The number of subzones 11 to 14 and 21 to 24 that are repeated is not limited. In a particular example, the subzones 21 to 24 may present a narrow width of about 1 mm, while the subzones 11 to 14 may present the same width or a greater width, e.g. lying in the range 1 mm to 3 mm.

Although using distinct and interleaved zones 10 and 20 serves to increase security, the invention also applies to a label that has only one zone 10 of optically-variable elements, and where appropriate, those elements may also themselves constitute random graphics elements for identification purposes.

The security label 1 may also include a conventional graphics identification code, made using an ink that is not optically variable, such as a bar code, a two-dimensional bar code or a Datamatrix.

The optically-variable elements of the zone 10 may be graphics elements forming various patterns, such as symbols or alphanumeric characters, for example.

Figure 10:
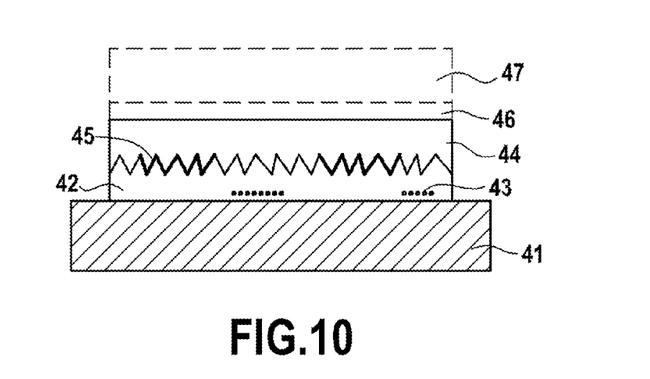
FIG. 10 is a section view of an example of a secure document in the form of a label adapted to be subjected to an authentication method of the invention.
Figure 11:
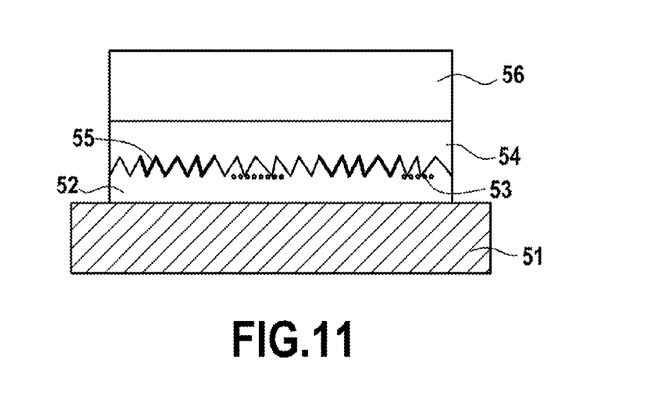
FIG. 11 is a section view of an example of a security label suitable for fastening to a supporting product and adapted to be subjected to an authentication method of the invention.

FIGS. 10 and 11 are section views of possible embodiments of secure labels that are suitable for authentication and where appropriate for authentication and identification by using a method of the invention.

FIG. 10 shows a paper label 41 constituting a substrate onto which a laminate 42 to 45 has been transferred. During manufacture, a support film 47 is used, e.g. made of polyethylene terephthalate (PET), having formed thereon a detachment layer 46, e.g. constituted by wax. A security layer 44 is formed on the detachment layer 46, the security layer comprising a protective varnish and a microstructure that includes a partial covering of foil 45 constituting optically-variable elements. Marks 43 are printed on the security label 44 or on an associated layer 42 including a thermally-reactivatable adhesive. Once the fabrication process has been completed and the laminate 42 to 45 has been fastened on the paper medium 41 with the help of the adhesive layer 42, both the support film 47 that was used during fabrication and also the detachment layer 46 (shown in dashed lines in FIG. 10) are removed in order to constitute a secure label on the paper medium comprising the elements 41 to 45.

FIG. 11 shows a label 56 made of polyester, such as PET, constituting a medium for supporting a laminate 52 to 55 and suitable for being stuck directly on a supporting medium 51 constituted by an article or by packaging. During fabrication, a microstructured security layer 54 is formed, e.g. by stamping, which layer is partially covered in foil 55 that constitutes optically-variable elements. Marks 53 are printed on the microstructured layer 54. An associated layer 52 including a permanent adhesive enables the set of elements 52 to 56 to be fastened on the medium 51, which may be made of silicone paper, for example. Where appropriate, a contrast layer may also be interposed between the microstructured layer 54 and the adhesive layer 52 so that the characteristics of the substrate do not falsify comparison with the reference fingerprint.

Advantageously, an additional antispecular or diffusing layer may be applied over at least part of the label, e.g. by printing on the layer opposite from the adhesive layer.

Figure 9:
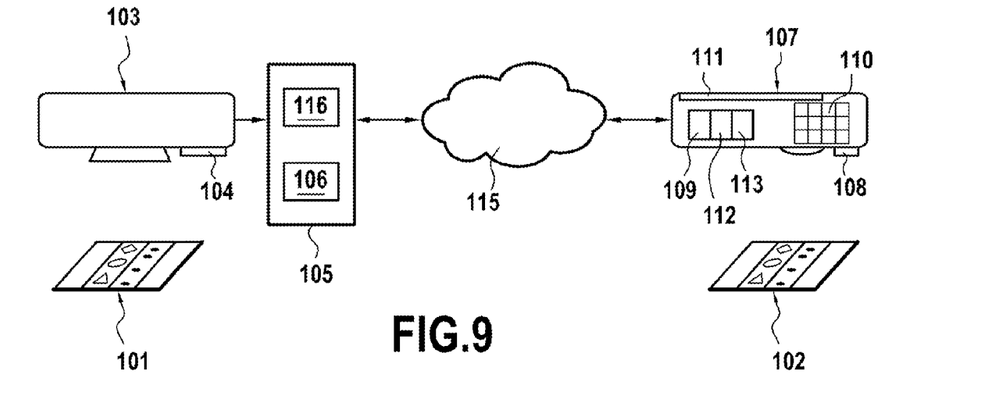
FIG. 9 is a block diagram of an example of a system for authenticating a secure document in accordance with the invention.

The authentication system of the invention essentially comprises the base elements shown in FIG. 9.

In FIG. 9, a first camera 103, possibly having a flash 104, is used to take reference pictures of a reference secure label 101 that may be of the same type as that described above with reference to FIG. 1. A server 105 is provided with a central processor unit 116 and with a storage unit 106 for storing a reference database made up of information transmitted from the camera 103.

The photographs of the reference label 101 are taken in ambient light only, or in a variant successively without flash and with flash, but always in the visible light range, with this being done using a camera 103 that needs to have a flash only if the above-mentioned variant is adopted, and they are sent in digital form to the server 105 in order to be processed and in order to enable digital fingerprints to be calculated and delivered to the database 106 as reference data (digital fingerprint) associated with the authentic label 101.

More particularly, in each shot, a graticule on the label 101 is located; a region of interest on the label 101 is extracted and normalized as a result of locating the graticule; the label 101 is identified by reading an identification code, such as that formed in the zone 20 of the region of interest; and the outlines of the zone of interest are characterized (which zone may for example be limited by the boundary 4 on the label 1 of FIG. 1).

Within the zone of interest, a zone 10 is characterized that contains at least one optically-variable element, and a digital signature is established for the processed shot.

Once each shot has a digital signature, a digital fingerprint is defined which is stored in the database 106 together with an identifier for characterizing the authentic label 101.

The server 105 may itself be constituted in conventional manner using a computer. The camera 103 may be constituted by any digital camera device and it may be distinct from the camera 107, or where appropriate it may be the same as the camera 107.

When examining a "suspect" label 102 of authenticity that is to be verified, use is made of the camera 107, which takes two successive photographs of the label 102 in the visible light range in succession, one without flash and the other with flash, which photographs can be sent in digital form to the server 105 in order to be processed.

A camera 107 with a flash 108, a communications unit 109, an input unit 110, a display unit 111, a processor 112, and a memory 113 serves to take shots of a "suspect" secure label 102 of authenticity that is to be investigated, and to communicate with the server 105 via a communications network 115.

The camera 107 is advantageously constituted by a mobile generic inspection appliance such as a smartphone having a camera function with flash. The camera 107 may be constituted by any other consumer appliance that is not dedicated to an authentication operation but that is provided with camera means with flash and with communications means, such as a personal digital assistant (PDA) or a computer.

When performing an inspection with the help of a camera 107 having a flash 108, the label 102 is photographed at least twice over a short time interval (e.g. an interval lying in the range 10 milliseconds (ms) to 1 second (s), however this range of time values is not limiting and it could be longer), one of the shots being taken without flash, merely making use of ambient light which may be natural or artificial, and the other shot being taken with flash under lighting conditions that are sufficiently far and distinct from those of ambient light on its own, but with all of the shots being taken in the same visible light frequency range. It should be observed that the successive shots taken with and without flash are taken close together in time, such that for the various shots of a given article, similar geometrical arrangements are conserved between the camera and the article being photographed. Any distortion that might be present in the various shots relating to the same article will thus in principle be identical or very similar for all of the shots.

The order in which shots are taken with and without flash is immaterial. The two shots make it possible to inspect the optically-variable characteristic of the label, then to calculate its digital fingerprint, and then to compare it with a digital fingerprint corresponding to an authentic reference security label, without there being any need to use lighting outside the frequency range of visible light.

When taking the shots with flash, the optically-variable elements of the zone 10 are active, thus making it possible to characterize those elements and to quantify differences relative to the shots taken without flash.

Using flash during one of the shots makes it possible in particular:

to eliminate the effects of secondary light sources (other than the flash) on the rendering of the photograph, since the optically-variable elements react strongly to the flash by being activated. The secondary sources, which in practice are numerous and varied, are difficult to control, and using flash under good shooting conditions (i.e. near-field conditions) makes it possible to attenuate their effects; and to ensure that shots are made uniform to an extent that is controlled and known in advance, thus making it possible to use the shot taken with flash as a reference.

For each shot of the label 102, the procedure is the same as for photographing the label 101, in other words locating a graticule, extracting and normalizing a region of interest, identifying the label, characterizing the outlines of the zone of interest, and establishing a digital fingerprint for the processed shot, associated with an identifier for characterizing the suspect label 102, and then characterizing the difference between the two photographs of the zone 10 that is supposed to contain at least one optically-variable element.

Once the suspect label 102 has been authenticated by characterizing optically-variable elements computed on the basis of two photographs, and once the label 102 has been correctly identified, reference is made to the reference digital fingerprint of the authentic label 101 with an identifier that corresponds to the identifier of the suspect label 102 that is to be verified, which reference is stored in the database 106 as characterizing the authentic label 101.

Figure 2:
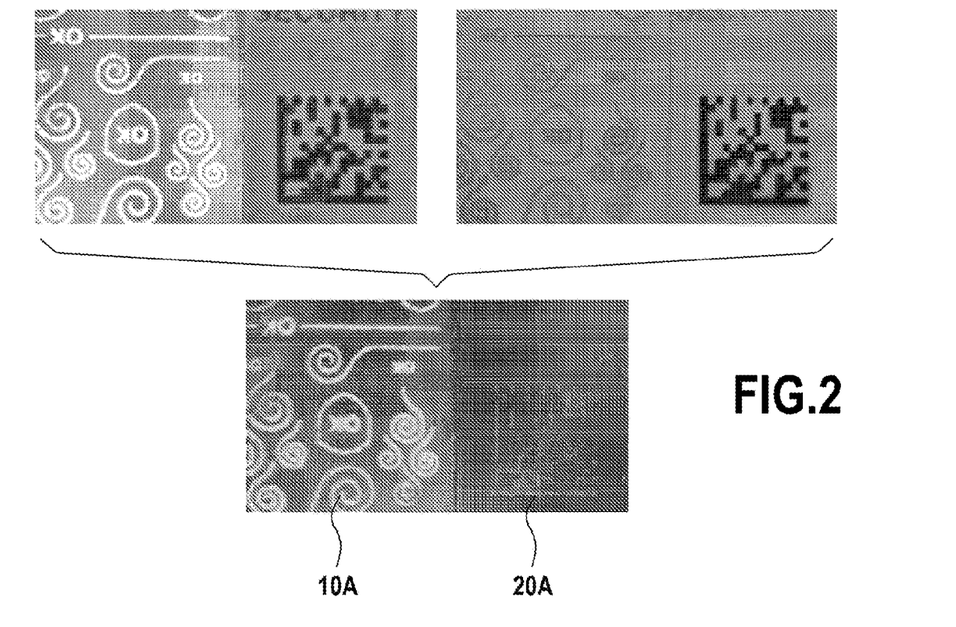
FIG. 2 shows an example of an image that results from taking the difference between two photographs of a zone of interest of an authentic label, the photographs being taken in succession under different lighting conditions, respectively with and without flash, in ambient light.

By way of example, FIG. 2 shows an image that results from taking the difference between two gray-scale photographs of a zone of interest of an authentic label taken under different lighting conditions, i.e. respectively with and without flash in ambient light that is not very bright. In this image, there can be seen a high-contrast zone containing optically-variable elements (foil elements).

Figure 3:
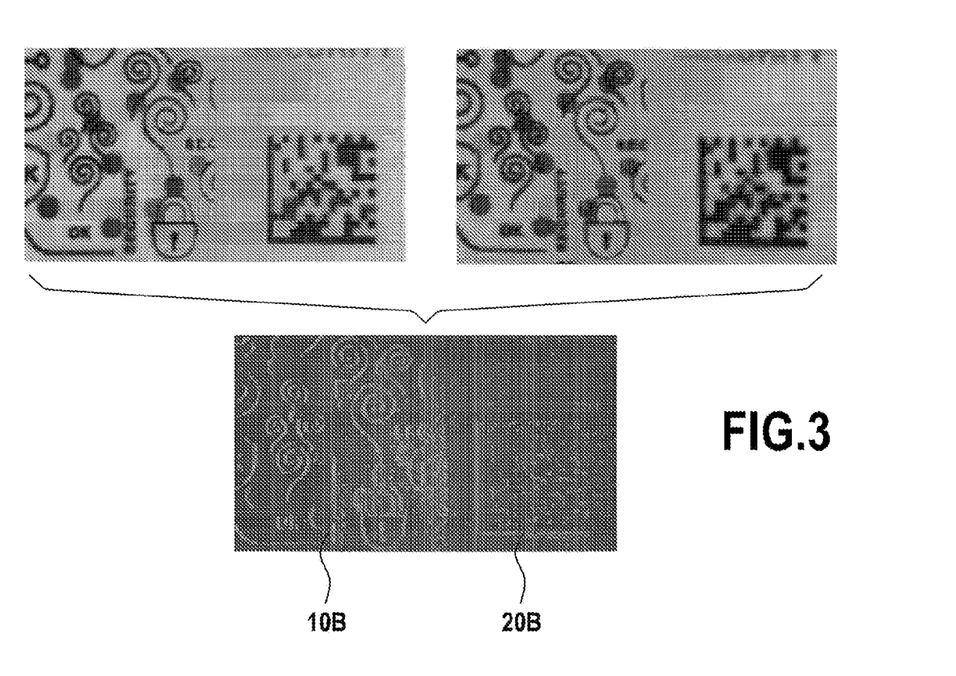
FIG. 3 is an example of an image resulting from taking the difference between two photographs of a zone of interest of a label with an imitation of a laminate.

FIG. 3 shows an image obtained by taking the difference between two gray-scale photographs of a zone of interest of a suspect label in which a laminate has been imitated (laminate layer comprising for example the elements 42 to 45 of FIG. 10 or the elements 52 to 55 of FIG. 11), the two photographs being taken under different lighting conditions, respectively with and without flash. In the image of FIG. 3, it can be seen that the patterns formed in the zone that is supposed to contain optically-variable elements (such as the elements 45 and 55 of FIGS. 10 and 11) are hardly perceptible.

Depending on the implementation, the method of the invention may be used to perform authentication only or to perform authentication with identification.

If it is desired to perform authentication only (checking only the optically-variable characteristic), without using the geometrical descriptors of those optically-variable elements, and thus without using the fingerprint, the authentication may for example be performed by studying a histogram.

A histogram is a statistical graph for showing the distribution of the brightnesses of the pixels in an image, i.e. the number of pixels for each brightness. For example, the histogram of an image having 256 gray levels is represented by a graph presenting 256 abscissa axis values, which by convention go from darkest (on the left) to lightest (on the right), and with the number of pixels at each gray level being plotted up the ordinate axis.

Figure 4:
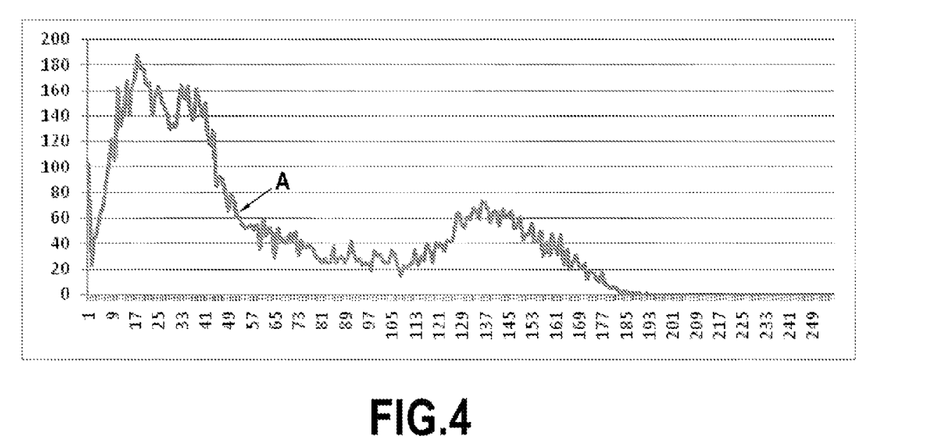
FIGS. 4 and 5 are histograms of the various images of FIGS. 2 and 3 respectively.
Figure 5:
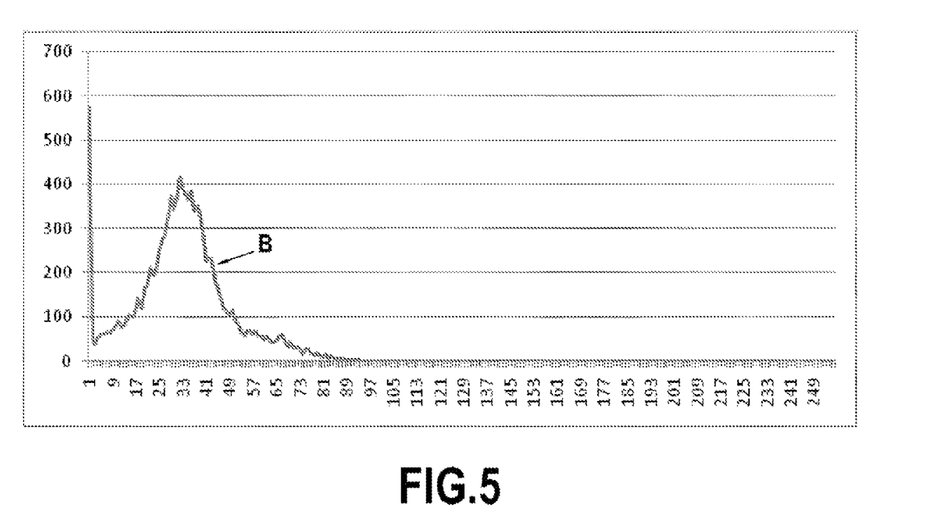

By way of example, FIGS. 4 and 5 show histograms A and B that correspond respectively to the difference images between a photograph with flash and a photograph without flash as shown in FIGS. 2 and 3, respectively.

In the histogram A of FIG. 4, it can clearly be seen that there is a first local maximum (which also constitutes a global maximum) that is very well marked for a gray level of less than 50, followed by a second local maximum for a gray level that is greater than 100, and that lies in the example shown around the value 140, representing the gray levels of the pixels corresponding to the outlines of the elements carried by the laminate presenting optical behavior that varies between the two shots, thereby indicating that this example relates to a label that is authentic and original.

The histogram B in FIG. 5 comes from a photocopy with an imitation laminate, and it reveals a first local maximum (which is also global) around the value 0 and a second local maximum that is meaningful, which is situated close to gray-scale value 33, beyond which there are no further gray-scale values presenting a pixel count of much more than zero.

The differences between the histograms A and B are manifest. In the histogram A there is at least one sizeable maximum (e.g. in the example under consideration a maximum having a number of pixels up the ordinate axis of more than 50) at gray-scale values above a predetermined level (e.g. in the example under consideration with gray-scale values greater than 100).

In the example of FIGS. 4 and 5, a simple rule for distinguishing between an original label with optically-variable elements and a forged copy comprising a mere image of optically-variable elements may be as follows:

if there exist one or more gray levels with x>100, such that the number y(x) of pixels for these gray levels is greater than 50, then the label is original and it contains optically-variable elements that have reacted to flash illumination, whereas they did not react to illumination in ambient light only.

Authentication only is advantageously associated with a step of comparing the verification digital fingerprint with the (unique) reference fingerprint. This comparison requires the distance between the two digital fingerprints to be computed and the computed distance to be compared with a predetermined threshold in order to authenticate the secure document label (102) for verification that is to be authenticated only when the distance is less than or equal to said threshold.

For authentication with identification, several methods are possible for the fingerprint comparison step. Under such circumstances, each authentic label possesses a unique fingerprint recorded in the reference database and indexed by an identifier.

For example, it is possible to perform a local approach for characterizing the histogram. Under such circumstances, the principle is to compare the brightness level of a pixel with the levels of its neighbors. The descriptor makes it possible to detect outlines and to insert therein the characteristics in a fingerprint.

The description work is performed on an authentic label 101 when it is entered into the reference database 106 with a record of a digital fingerprint characteristic of the authentic label 101.

When checking a suspect label 102, the same work is performed in order likewise to define a digital fingerprint that is characteristic of the suspect label 102.

The characteristic digital fingerprints of the suspect label 102 and of the corresponding authentic label 101 are both represented by respective vectors, and the distance between the vectors is calculated. There are several possible methods for calculating this distance. One of them is histogram intersection.

In the variant in which two successive photographs are taken of the authentic label 101 under different lighting conditions, the distance is calculated between the "difference" digital signatures of the reference authentic label 101 and of the suspect label 102 that is to be verified.

When the suspect label 102 is a mere photocopy, the difference between the two shots of the suspect label 102 is negligible, since the region of interest no longer has a genuine optically-variable element and therefore does not become active under the effect of a light source on the same axis as the shooting axis when using flash lighting, such that the distance between the "difference" digital document of the authentic label 101 (corresponding to a high value) and the "difference" digital fingerprint of the suspect label 102 (corresponding to a very small value) is great, thus making it possible to identify that the suspect label 102 is not authentic.

This may be expressed as follows:

let reference Delta 1=F[f(flash reference photo)−f(non-flash reference photo)]; and let suspect Delta 2=F[f(flash suspect photo)−f(non-flash suspect photo)];

if Delta 2 is less than or equal to a predetermined threshold, then it is assumed that no optically-variable element is present in the suspect label 102 and it is considered as being invalid;

if Delta 2 is greater than said determined threshold and if Delta 1 is also equal to Delta 2, then the suspect label 102 is considered as being authenticated; and if Delta 2 is greater than said predetermined threshold and if |Delta 1−Delta2|≥ϵ, where ϵ is a non-zero threshold value, then the suspect label 102 is considered as being a forgery.

Figure 6:
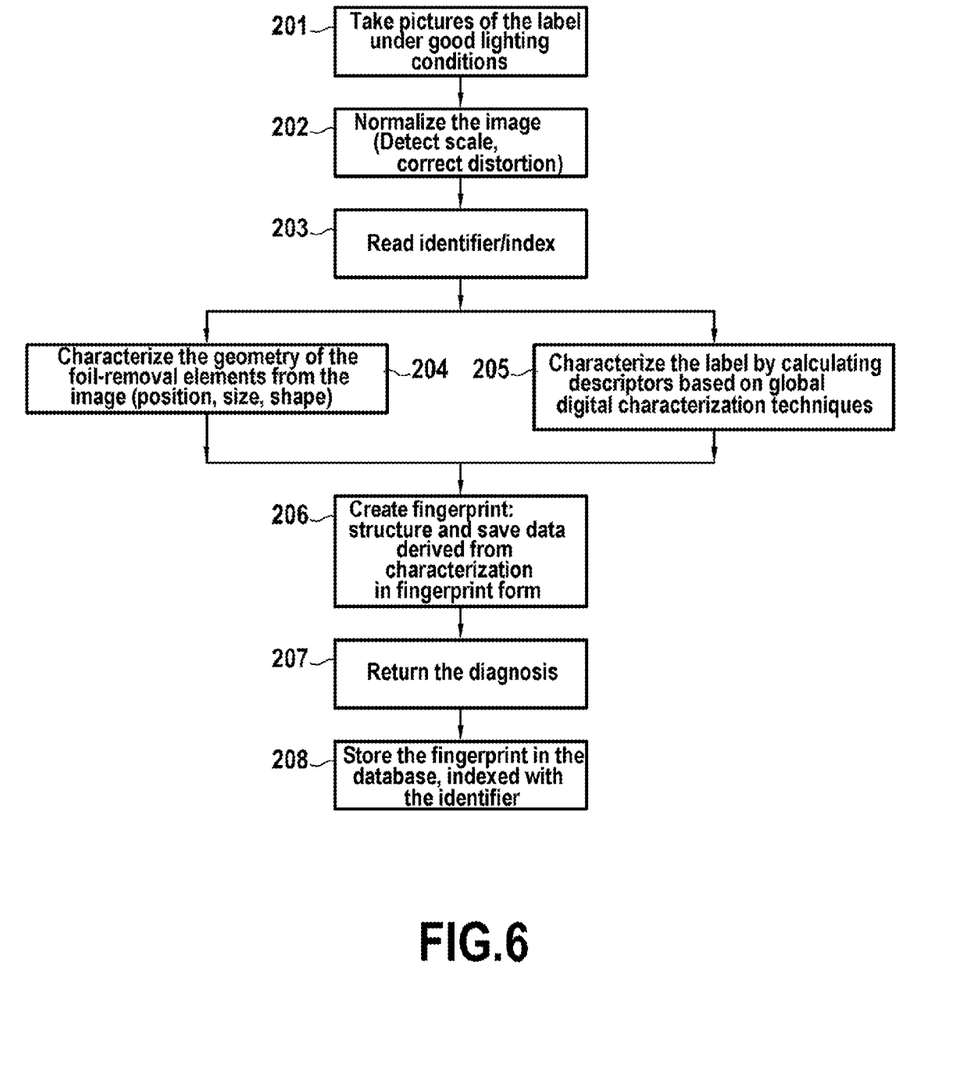
FIG. 6 is a flow chart showing the various steps of a method of taking a fingerprint and storing it in a database concerning a secure document that is to be subjected to an authentication method of the invention.
Figure 7:
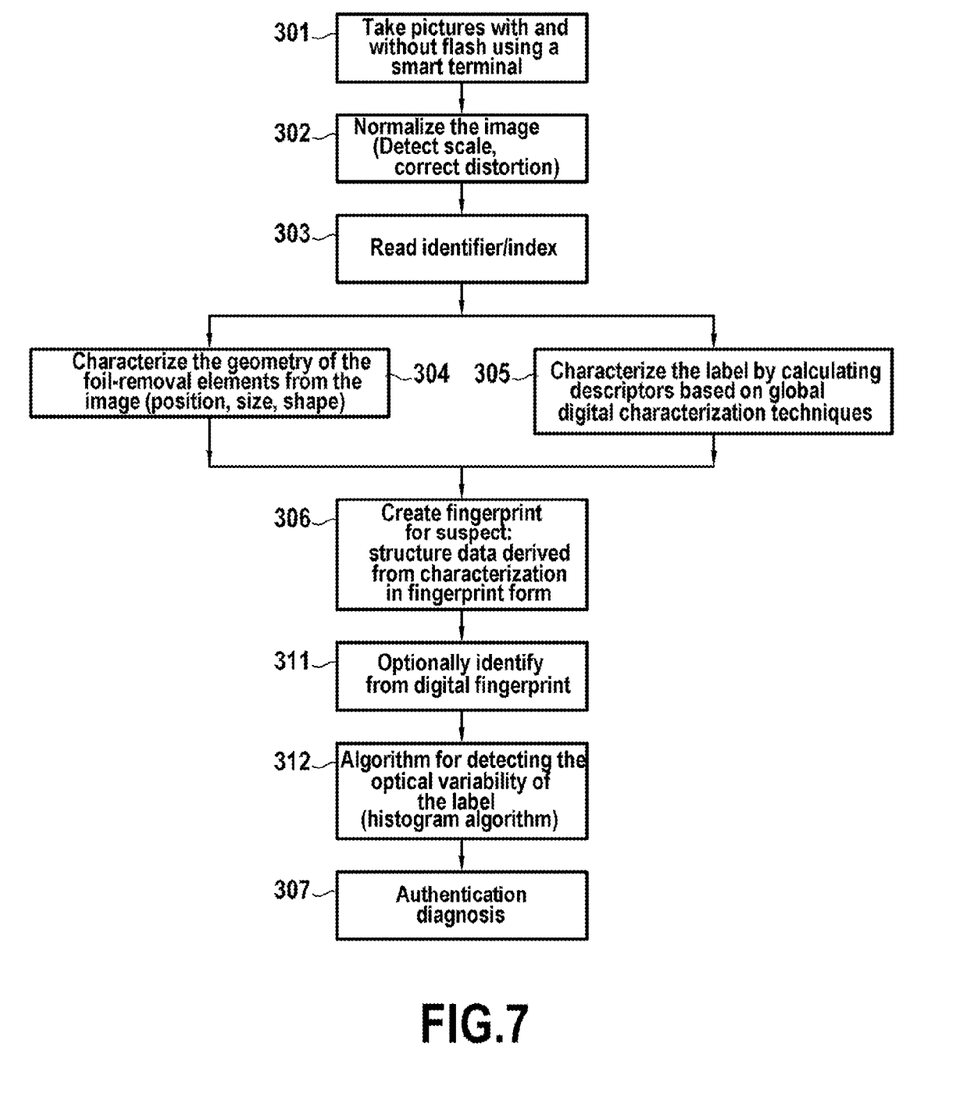
FIG. 7 is a flow chart showing the various steps of a method of checking a secure document of authenticity that is to be verified in accordance with the invention.
Figure 8:
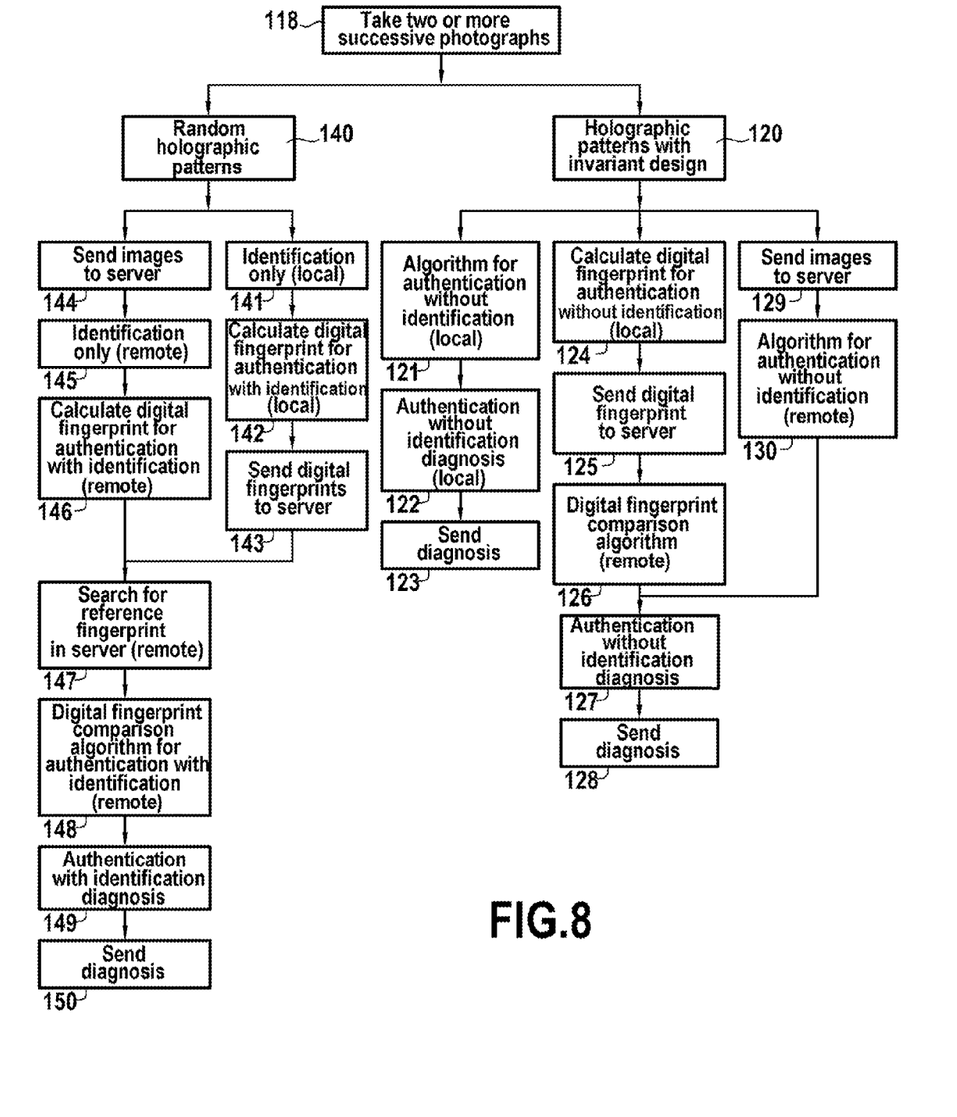
FIG. 8 is a flow chart showing various steps of the authentication method of the invention in a variety of variant implementations.

FIGS. 6 to 8 are flow charts showing various possible implementations of the authentication method of the invention.

The method of the invention may be applied to situations in which the optically-variable elements define a geometrically-invariant holographic pattern, thus enabling authentication to be performed on its own, i.e. in combination with a single fingerprint, which authentication on its own consists in confirming that the label does indeed have the optical effect, but does not specify which label is involved.

Several examples of these implementations are shown in FIG. 8 stemming from a step 120 in which the labels in question have holographic patterns of invariant design, being labels that have had two or more photographs taken in succession in a step 118 using a camera 107 having at least one flash 108, a communications unit 109, a memory unit 113, a calculation unit 112, a display unit 111, and an input unit 110, such as a mobile smartphone.

In the implementation shown in steps 121 to 123, all of the processing is performed locally by the smart camera 107. The reference database is stored in the memory 113 of the camera 107 and it comprises a single reference fingerprint, since the holographic pattern is invariant.

In a step 121, the calculation unit 112 of the camera 107 acts locally to perform steps of calculating a verification digital fingerprint on the basis of the successive images taken in step 118, and of comparing the locally calculated verification digital fingerprint with the reference digital fingerprint stored in the memory 113 of the camera 107.

In step 122, a local diagnosis is performed for authentication only on the basis of the successive images taken in step 118; and in step 123, it is possible to deliver a diagnosis using the communications unit 109.

In another implementation shown in steps 124 to 128, a verification digital fingerprint is calculated locally in step 124 on the basis of successive images taken in step 118 by the calculation unit 112 of the camera 107.

In step 125, the communications unit 109 of the camera sends the verification digital fingerprint to the server 105, which then acts in following step 126 to compare the verification digital fingerprint with a reference digital fingerprint stored in the database 106 of the server 105.

Step 127 corresponds to authentication-only diagnosis on the basis of the successive images taken in step 118, and step 128 corresponds to sending the diagnosis to the camera 107 via the communications unit 109, or forwarding the diagnosis to other addressees.

In the implementation shown in steps 129 and 130, in step 129 images resulting from the camera 107 taking successive verification photographs in step 118 are sent to the server 105 without any digital fingerprint being calculated. In step 130, it is the server 105 that uses an authentication-only algorithm to compare the images received in step 129 from the camera 107 with the reference images stored in the database 106 of the server 105.

After step 130, the method returns to step 127 corresponding to authentication-only diagnosis, on the basis of the successive images taken in step 118.

In step 128, the diagnosis is returned to the camera 107 via the communications unit 109 or the diagnosis is forwarded to other addressees.

The method described in the above implementations in application to optically-variable elements that define a geometrically-invariant holographic pattern may also be performed with an additional step of identifying a label by reading a simple identifier, such as a bar code, or a two-dimensional bar code or data matrix, for example. Identification is then performed using a digital code in a manner that is independent of authentication.

Such an identification-only stage may be followed by an identification stage making use of a reference digital fingerprint e.g. when the digital fingerprint takes account of the positions of holographic elements of invariant design relative to the label or indeed takes account of elements printed on the label.

In other implementations shown in FIG. 8, the optically-variable elements define a holographic pattern that is geometrically variable, i.e. random or non-deterministic.

These alternative implementations of FIG. 8 are shown as stemming from a step 140 in which the labels that have had two or more photographs taken in succession in step 118 by the camera 107 have holographic patterns of random design. It is then possible to perform authentication with identification by using a reference digital fingerprint in a reference database.

The digital fingerprint calculated for each of the successive shots using flash exposure and exposure without flash, and a digital fingerprint calculated on the difference between the two images that result from those two shots characterize the outlines and the reflective power of those outlines when exposed with and without flash.

If the holographic pattern is variable, the digital fingerprint is itself variable in each label and is thus unique for each label, thereby enabling authentication to be performed together with identification, whereas when the holographic pattern is invariant, the digital fingerprint is common to all of the labels and it is possible only to perform authentication, without identification, since the reference element is the same for all of the labels.

When performing authentication with identification, it is necessary to begin by establishing a reference database with reference data corresponding to each individual authentic label, after which it is possible to verify the authenticity of a suspect label by comparing it with the corresponding reference label.

There follows a description of the enrollment process, i.e. creating a reference database.

Each authentic label that has been created is identifiable by the equivalent of a unique code, which may for example be a bar code or indeed a code of color dots or of black and white dots, using dots of different sizes.

Using the camera 103, at least two successive photographs are taken of an authentic label that is to be referenced, one being taken with flash and the other without flash, or in a variant, only one photograph is taken, e.g. without flash.

Identification only is then performed by reading the unique identification code in the or each photograph or in all of the successive photographs of a given authentic label that is to be referenced.

A reference digital fingerprint is then calculated from the successive shots of the authentic label, using as a descriptor the outlines of a zone of optically-variable elements, for example.

The calculated reference digital fingerprints corresponding to the various photographed authentic labels are stored in a reference database 106 of the server 105 in association with an input key constituted by their unique identification codes as determined during the identification-only step.

The stage of inspecting a suspect label begins with step 118 of taking two or more successive photographs of the label, at least one without flash, by using ambient light with a remote light source that is more or less diffuse and in a random position, and at least one other with flash, using the camera 107, both photographs being taken using lighting in the visible light frequency range.

As shown in FIG. 8, for labels having random holographic patterns (block 140), there are two main variant implementations.

In the variant comprising steps 141 to 143 and 147 to 150, step 141 is performed locally by the intelligent camera 107 and consists only in identifying the suspect label with the help of an identification code such as a bar code or a dot code.

In step 142, the calculation unit 112 of the camera 107 acts locally to perform authentication only on the basis of two or more successive photographs of the label that is to be verified as taken respectively with and without flash, and then a verification digital fingerprint is calculated, e.g. using as descriptors the outlines of a zone that is assumed to include optically-variable elements.

In step 143, the verification digital fingerprint as calculated locally in step 142 is sent to the server 105.

In step 147, the server 105 uses the identifier determined during the identification-only step 141 to search for the reference digital fingerprint that is supposed to correspond to the verification digital fingerprint calculated in step 142.

In step 148, the server 105 compares the reference digital fingerprint found in step 147 with the verification digital fingerprint sent to the server in step 143.

Step 149 corresponds to an authentication and identification diagnosis on the basis of the result of the digital fingerprints being compared in the server 105, and step 150 corresponds to returning the diagnosis to the camera 107 via its communications unit 109.

The variant implementation comprising steps 144 to 150 in FIG. 8 is similar, but no local processing is performed.

In step 144, two or more successive photographs of the label for verification taken respectively with and without flash by the camera 107 under lighting conditions using the visible light frequency range are sent to the server 105.

In step 145, the server 105 acts remotely to perform identification only of the suspect label with the help of an identification code such as a bar code or a dot code that can be read in the images of the suspect label as transmitted to the server during the preceding step 144.

In step 146, the server 105 proceeds to perform authentication only on the basis of two or more successive photographs of the suspect label for verification taken respectively with and without flash, and it then calculates a verification digital fingerprint, e.g. using as descriptors the outlines of a zone that is assumed to include optically-variable elements.

Thereafter, the method uses steps 147 to 150 which are the same as in the above-described variant implementation comprising steps 141 to 143 and 147 to 150.

When the fingerprint is calculated locally (step 142), the bandwidth needed for communication between the camera 107 and the server 105 is small since the size of a digital fingerprint is much less than the size of an image. Nevertheless, the compiled code for calculating the fingerprint of the label that is to be verified is to be found stored in the memory of the camera 107, such that this implementation is to be preferred when there is no risk of dishonesty and of the code leaking from the camera 107. In contrast, when the fingerprint is calculated in the server 105, the bandwidth needed for communication between the camera 107 and the server 105 is greater since it is images that are transferred, but security is greater since no compiled code for digital fingerprint calculation is stored at local level in the camera 107.

In the verification process, fingerprint calculation is analogous to that described above for enrollment in the reference database and the same descriptors are calculated after the suspect label has been identified from a digital code, in order to search for the corresponding reference in the database.

In both situations, the fingerprint comparison of step 148 is performed in the server 105, thereby guaranteeing protection for the integrity of the reference database.

Once the descriptors of the fingerprint of the label for verification and the fingerprint of the reference label have been compared one by one, it is possible in the event of a positive result to certify the authentication and the identification of step 149, and in step 150 the server can then return the diagnosis of the inspection to the camera 107 that is constituted by an intelligent terminal.

FIGS. 6 and 7 show preferred implementations of the invention.

FIG. 6 shows a method of creating a reference database containing reference fingerprints of authentic labels.

In step 201, an authentic label 101 is photographed using a camera 103 under good lighting conditions, using the visible frequency range.

In step 202, the image is normalized (scale is detected, distortion is corrected).

In step 203, an identifier or index is read on the label 101.

The following step of characterizing the authentic label may be performed in several variants. The image of the label given by the zone without foil may be considered as a macrotexture in which the foil-removal elements form attributes and are disposed randomly on the surface of the label. Any macrotexture analysis approach can be used in this context.

In a first possible variant, illustrated by step 204, the foil-removal elements are geometrically characterized from the image. In this characterization of the foil-removal elements by a structural approach, each of the elements is characterized at least by its position in space relative to a reference element of the label, by its size, and by its shape.

In another possible variant, illustrated by step 205, which may be performed as an alternative to or as well as step 204, global characterization is performed. In this global characterization of the label by calculating descriptors based on global digital characterization approaches, it is the spatial distribution of the foil-removal elements that is characterized. The image of the label may be considered as a macrotexture in which the foil-removal elements constitute primitives. This portion of the label can thus be characterized by analyzing the spatial distribution of the foil-removal elements. An example of a characterization method using a global approach in order to constitute a digital fingerprint base is described in document WO 2005/055086 A1.

The following step 206 consists in creating a fingerprint by structuring and saving data obtained by the characterization performed in step 204 and/or step 205.

Step 207 consists in returning a diagnosis, e.g. serving to eliminate labels in which the fingerprint is of poor quality, and step 208 comprises putting the fingerprint created in step 206 into the database in association with the identifier of the label as its index.

It should be observed that the variant of step 204 is advantageous if some of the details of the label are not always visible depending on illumination (i.e. in a photograph taken without flash when performing verification). Under such circumstances, during enrollment, all of the existing elements are specified individually so that when checking it is possible to verify that all of those that are present are included in the enrollment record.

The variant of step 205 may be useful if the photographs are of good quality and the foil-removal elements will appear without exception in the photograph taken without flash when performing verification. Under such circumstances, there is no need to go down to the level of the granularity of the individual foil-removal elements and global characterization for characterizing the fixed images suffices.

FIG. 7 shows an implementation of a method for checking a suspect label using an intelligent terminal such a as smartphone 107 having functions as defined above with reference to FIG. 9.

In step 301, the characteristics of the intelligent terminal 107 being used are identified and at least two successive photographs are taken over a very short time interval (preferably shorter than one second) of the suspect label of authenticity under investigation, with at least one of the photographs being taken with flash and at least one other being taken without flash, under lighting conditions in the visible light frequency range.

In step 302, the image is normalized (scale detected, distortion corrected).

In step 303, the identifier and/or index of the suspect label is read and the digital fingerprint corresponding to the identifier and/or index is recovered from the reference database.

The following step comprises characterizing the suspect label and may be performed using several variants in a manner analogous to above-described steps 204 and 205.

In a first possible variant corresponding to step 304, foil-removal elements are geometrically characterized from the image, i.e. by using a structural approach, each of the foil-removal elements being characterized by its position in space relative to a reference element of the label, by its size, and by its shape.

In another possible variant, corresponding to step 305, the label is characterized by calculating descriptors based on global digital characterization approaches. The image of the label may be considered as being a macrotexture in which the foil-removal elements constitute primitives, the portion of the label that is assumed to include foil-removal elements is characterized by analyzing the spatial distribution of the elements. Once more, reference may be made to document WO 2005/055086 A1 for further details.

The following step 306 of creating the fingerprint comprises structuring the data derived from the characterization of step 304 and/or of step 305.

In step 311, it is possible in optional manner to perform identification by digital fingerprint.

The distance is calculated between the fingerprint of the suspect label 102 and the fingerprint of the reference label 101. If the distance is greater than a predetermined threshold, then the label is an imitation of the reference label, otherwise graphical identification is confirmed. It should be observed that instead of referring to a threshold, it is possible in equivalent manner to make use of other methods, such as probabilistic methods in order to decide whether a suspect label is valid.

In step 312, the optically-variable nature of the label is detected prior to the final step 307 of authentication diagnosis.

In order to detect the optically-variable nature, it is possible to use an algorithm based on the histogram concerning the difference between the image taken with flash and the image taken without flash.

Nevertheless, in certain special circumstances, and in particular if each foil-removal element has been accurately listed, geometrically speaking, it is possible to crop each of the foil-removal elements in each of the photographs taken with and without flash. The difference between these pairs of photographs is then measured, where such measurements may merely involve measuring the histogram. If there is any significant difference between the two photographs, then the foil-removal element is classified as being optically variable. The algorithm performs the above operation on each foil-removal element. If the number of foil-removal elements for which optical variability is to be shown is greater than a predetermined threshold, then the previously identified label is now authenticated. The authentication method of the invention makes simple use of optical phenomena that lie in the visible light frequency range and for which differences are measured, without it being necessary to make use of specialized equipment.

In summary, the authentication method of the invention consists in particular in using a security label provided with optically-variable elements, in calculating a digital fingerprint for these optically-variable elements by a method that, in one particular implementation, may involve successive shots of an authentic reference security label taken under different lighting conditions, in repeating these operations on a suspect security label that is to be authenticated, and in comparing the calculated digital fingerprints in order to obtain a diagnosis concerning the authenticity of the label that is to be authenticated. Nevertheless, for the authentic reference security label, it is possible to make do with a single shot taken under predefined lighting conditions, e.g. ambient lighting conditions, in order to define a digital fingerprint.

The method of the invention can thus be implemented easily in order to act quickly, reliably, and automatically to detect labels that are forgeries or to authenticate labels that are authentic, without it being necessary to make use of equipment that is specific and expensive, and without it being necessary to make use of difficult handling techniques.

The method of the invention may be applied to any type of security label, so long as the security label includes at least one zone with optically-variable elements that present reflection properties different from the surface of the label with respect to a light source in the visible light frequency range (e.g. a flash) that is pointed in predetermined manner relative to the surface (e.g. perpendicularly thereto).

The active zone of the security label must thus be capable of presenting the ability to reflect without being dazzling. For this purpose, it suffices that the quantity of optically-variable elements lies below a saturation threshold for the camera 103 or 107.

In practice, the optically-variable elements must present reflection properties that are different from those of the remainder of the surface of the document, i.e. reflection properties that are different from the properties of materials such as paper, card, or plastics materials. The proportion of optically-variable elements in a zone of interest must not constitute more than half of the area of this zone and preferably does not constitute more than one-third of said area.

The invention claimed is:

1. A method of automatically authenticating a secure document including at least one label-forming portion, the method being which comprises the following steps:
    a) printing an authentic label provided with optically-variable elements including at least a first zone of optically-variable elements of a first type presenting reflection properties that are different from the surface of the label for a light source in the visible light frequency range oriented in predetermined manner relative to said surface;
    b) photographing said authentic label at least under first lighting conditions in the visible light frequency range in order to create at least one first reference image;
    c) calculating a reference digital fingerprint of the label from said at least one first reference image and storing said reference digital fingerprint;
    d) photographing a label that is to be verified of a secure document of authenticity that is to be verified under conditions similar to the conditions in which the authentic label was photographed, shooting from the same angle and in succession at least in first lighting conditions in the visible light frequency range and in second lighting conditions essentially different from the first lighting conditions and in the same visible light frequency range, in order to create at least first and second verification images, using a camera having at least a communications unit, a memory unit, and a calculation unit;
    e) verifying the optically-variable nature of said elements from said at least first and second verification images and calculating a verification digital fingerprint of the label for verification from at least one of said first and second verification images; and
    f) comparing the verification digital fingerprint and the corresponding reference digital fingerprint, calculating the distance between these two digital fingerprints, and comparing said distance with a predetermined threshold in order to authenticate the label for verification of the secure document that is to be authenticated only if said distance is less than or equal to said threshold.

2. A method according to claim 1, wherein one of the first and second lighting conditions consists in lighting with the help of a flash, while the other one of the first and second lighting conditions consists in lighting in ambient light without flash.

3. A method according to claim 1, wherein said optically-variable elements of the first type comprise holographic patterns of foil removal constituted by foil graphics elements in a transparent strip or by transparent graphics elements in a holographic foil strip.

4. A method according to claim 1, wherein an authentic label is printed that includes at least said first zone with optically-variable elements of the first type, and a second zone juxtaposed with said first zone and including random graphics elements for identification purposes.

5. A method according to claim 4, wherein each of said first and second zones is divided into a plurality of subzones, and wherein the subzones of the first and second zones are juxtaposed in alternation in interleaved manner.

6. A method according to claim 5, wherein each essentially rectangular subzone presents a width lying in the range 0.5 mm to 5 mm.

7. A method according to claim 1, wherein said optically-variable elements define a geometrically-invariant holographic pattern, and wherein in order to create a reference image, the following steps are performed:
   i) photographing a label;
   ii) locating a graticule on the label;
   iii) normalizing a zone of interest of the label as a result of locating the graticule;
   iv) characterizing outlines of the zone of interest in which there is situated said first zone of optically-variable elements; and
   v) creating a fingerprint by structuring and saving said fingerprint as a reference fingerprint.

8. A method according to claim 1, wherein said optically-variable elements define a geometrically-variable holographic pattern, and wherein, prior to a step of putting the label into service, and in order to create a reference database, the following steps are performed:
   i) photographing a label;
   ii) locating a graticule on the label;
   iii) normalizing a zone of interest of the label as a result of locating the graticule;
   iv) identifying the label by reading an encoded portion situated in the zone of interest and characterizing outlines of the zone of interest in which there is situated said first zone (10) having optically-variable elements; and
   v) creating a fingerprint by structuring and saving the fingerprint as a reference digital fingerprint indexed by an identifier in a reference database.

9. A method according to claim 8, wherein, after the step of calculating a reference digital fingerprint of the label from said at least first reference image, followed by recording said reference digital fingerprint indexed by an identifier in a reference database, said comparison step is performed between the verification digital fingerprint and the corresponding indexed referenced digital fingerprint stored in the reference database.

10. A method according to claim 7, wherein the reference digital fingerprint is stored locally in said memory unit of the camera, and wherein the calculation unit of the camera is used locally to perform the authentication calculation step consisting in verifying that the label for verification includes the expected optically-variable elements.

11. A method according to claim 7, wherein the reference database is stored in a server that is remote from said camera, wherein the calculation unit of the camera is used locally to perform the step of calculating the verification digital fingerprint, and wherein the communications unit of said camera is used to transmit said verification digital fingerprint to said server in order to enable said server to perform the step of comparing the verification digital fingerprint with the reference digital fingerprint and the step of performing authentication only and the step of performing authentication and identification.

12. A method according to claim 7, wherein the reference database is stored in a server that is remote from said camera, wherein the communications unit of said camera is used to transmit said first and second verification images to said server, and wherein said server is used to perform the steps of calculating the verification digital fingerprint, of comparing the verification digital fingerprint with the reference digital fingerprint, and of performing authentication only and authentication with identification.

13. A method according to claim 11, which further includes a final step consisting in transmitting the result of the authentication step performed by the server to the communications unit of the camera.

14. A method according to claim 1, wherein, during the step of creating a digital fingerprint, said optically-variable elements are characterized geometrically from the image.

15. A method according to claim 1, wherein, during the step of creating a digital fingerprint, the label is characterized by calculating descriptors based on global digital characterization approaches.

16. A method according to claim 1, wherein, during the step of photographing a label for verification, the successive photographs for creating at least said first and second verification images are taken in a burst over a time interval that is less than or equal to one second.

* * * * *